United States Patent
Masamura et al.

(10) Patent No.: US 7,389,969 B2
(45) Date of Patent: Jun. 24, 2008

(54) CHEMICAL LIQUID VALVE

(75) Inventors: Akinori Masamura, Komaki (JP); Shigeru Osugi, Komaki (JP)

(73) Assignee: CKD Corporation, Komaki (JP)

( * ) Notice: Subject to any disclaimer, the term of this patent is extended or adjusted under 35 U.S.C. 154(b) by 0 days.

(21) Appl. No.: 11/363,993

(22) Filed: Mar. 1, 2006

(65) Prior Publication Data

US 2006/0145107 A1   Jul. 6, 2006

Related U.S. Application Data

(63) Continuation of application No. PCT/JP2004/013739, filed on Sep. 21, 2004.

(30) Foreign Application Priority Data

Oct. 2, 2003   (JP) .............................. 2003-344292

(51) Int. Cl.
  *F16K 1/00*   (2006.01)
  *F16K 15/00*   (2006.01)
(52) U.S. Cl. ...................... 251/331; 251/63.5
(58) Field of Classification Search .................. 251/61, 251/61.1, 61.2, 61.3, 61.4, 61.5, 331, 335.2, 251/62, 63, 63.4, 63.5, 63.6
See application file for complete search history.

(56) References Cited

U.S. PATENT DOCUMENTS

| 2,051,350 | A | * | 8/1936 | Smith ......................... 137/242 |
| 2,853,270 | A | * | 9/1958 | Boteler ...................... 251/331 |
| 3,275,291 | A | * | 9/1966 | Meijers ....................... 251/331 |
| 5,002,086 | A | * | 3/1991 | Linder et al. ................. 137/312 |
| 5,065,980 | A | * | 11/1991 | Pedersen ..................... 251/144 |
| 5,669,596 | A | * | 9/1997 | Yoshikawa et al. ....... 251/335.2 |
| 5,706,859 | A |   | 1/1998 | Backlund |
| 5,779,224 | A |   | 7/1998 | Fukano et al. |
| 6,155,535 | A | * | 12/2000 | Marcilese ................... 251/331 |
| 6,352,238 | B1 | * | 3/2002 | Roman ......................... 251/65 |
| 2001/0022353 | A1 |   | 9/2001 | Takeda et al. |

FOREIGN PATENT DOCUMENTS

| JP | A 61-218873 | 9/1986 |
| JP | B2 6-27552 | 4/1994 |
| JP | A 08-075017 | 3/1996 |
| JP | A 09-229213 | 9/1997 |
| JP | A 09-273641 | 10/1997 |
| JP | Y2 2580645 | 9/1998 |
| JP | A 11-182708 | 7/1999 |
| JP | Y2 2603964 | 4/2000 |
| JP | A 2001-263508 | 9/2001 |
| JP | A 2002-089725 | 3/2002 |
| JP | B2 3421346 | 6/2003 |

* cited by examiner

*Primary Examiner*—John K Fristoe, Jr.
(74) *Attorney, Agent, or Firm*—Oliff & Berridge, PLC (57) ABSTRACT

A chemical liquid valve is arranged such that a diaphragm coupled to a piston rod is brought into/out of contact with a valve seat provided between an inlet port and an outlet port. To achieve a chemical liquid valve providing stable sealing strength, the diaphragm includes an engagement part whose top end is formed in semispherical shape, which is inserted and engaged in a recess of the piston rod so that the engagement part of the diaphragm comes into point contact with an inner wall of the recess of the piston rod. Thus, the piston rod swingably holds the diaphragm.

3 Claims, 8 Drawing Sheets

CHEMICAL LIQUID VALVE

CROSS-REFERENCE TO RELATED APPLICATIONS

This application is a continuation application based upon and claims the benefit of the prior PCT International Patent Application No. PCT/JP2004/013739 filed on. Sep. 21, 2004, the entire contents of which are incorporated herein by reference.

BACKGROUND OF THE INVENTION

1. Field of the Invention

The present invention relates to a chemical liquid valve arranged such that a valve element coupled to a driving device is brought into/out of contact with a valve seat placed between an inlet port and an outlet port.

2. Description of Related Art

Figure 11:
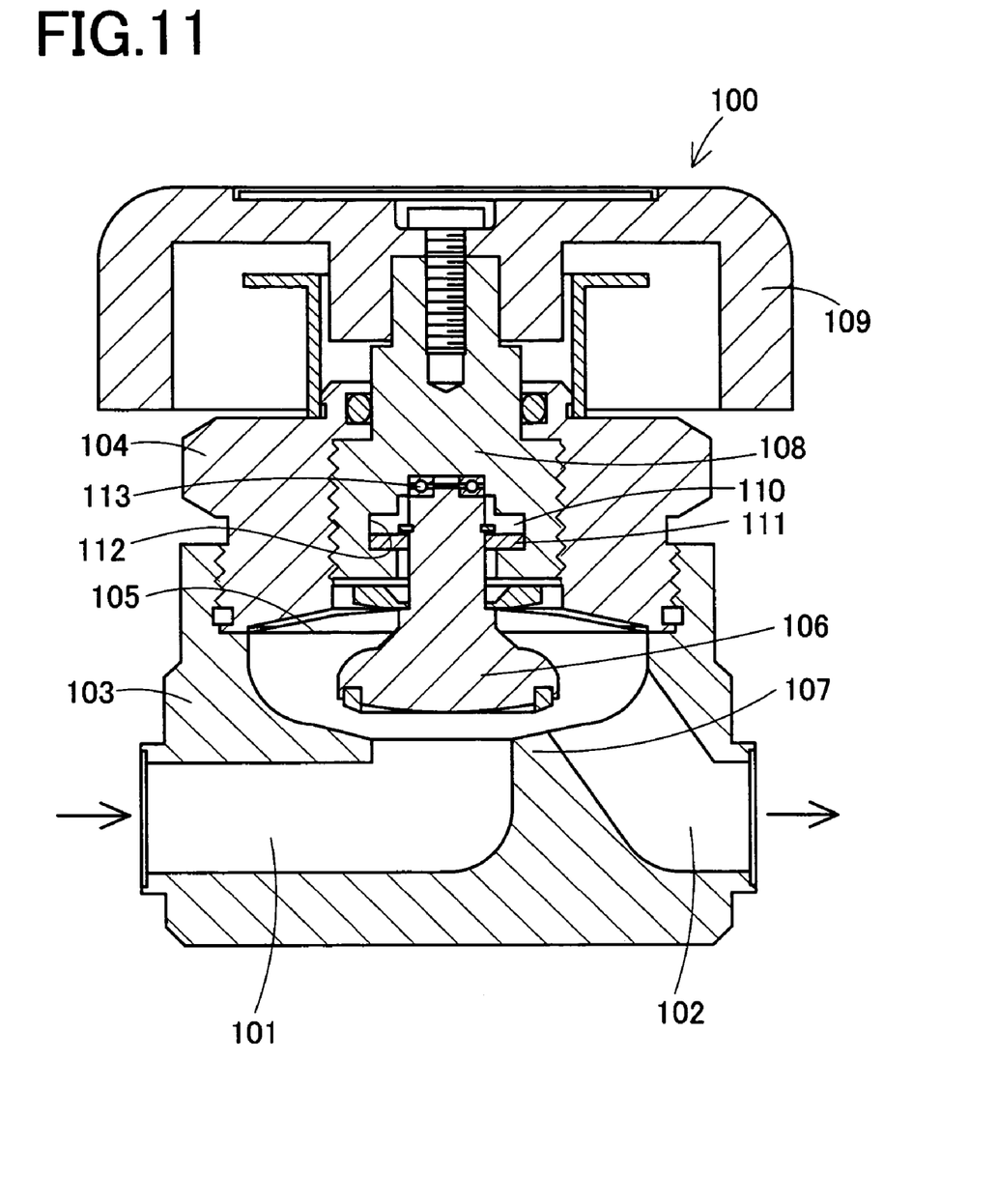
FIG. 11 is a sectional view of a chemical liquid valve in a prior art.

In a conventional manufacturing line for semiconductors, medical products, and others, a chemical liquid valve has been used to control a chemical liquid such as purified water, acid, and alkali. FIG. 11 is a sectional view of a chemical liquid valve 100 in a prior art.

The chemical liquid valve 100 has a body 103 formed with an inlet port 101 and an outlet port 102, and a diaphragm 105 held between the body 103 and a bonnet nut 104. The diaphragm 105 is fixed with a valve element 106 placed across the center of the diaphragm 105. The diaphragm 105 is arranged to bring the valve element 106 into/out of contact with a valve seat 107 formed between the inlet port 101 and the outlet port 102. Threadably mounted in the bonnet nut 104 is a slide shaft 108 whose top is secured with a handle 109. The slide shaft 108 is formed, in its bottom, with a recess 110 in which the upper portion of the valve element 106 is placed. A ring washer 111 is fit on the upper portion of the valve element 106, which is supported by the ring washer 111 engaged in a large-diameter portion 112 of the recess 110. Accordingly, when the handle 109 is turned to move the slide shaft 108 up/down, moving the valve element 106 up/down, a valve opening degree can be controlled. A bearing 113 is further provided between the valve element 106 and the slide shaft 108 to prevent the valve element 106 from turning together with the slide shaft 108 (see Japanese unexamined patent application publication No. 11-182708(1999) for example).

BRIEF SUMMARY OF THE INVENTION

However, when the conventional chemical liquid valve 100 is disposed in for example a liquid supply line of a semiconductor manufacturing apparatus to control a high-pressure chemical liquid, the valve seat 107 may become deformed when the valve element 106 is brought into strong contact with the valve seat 107. In this case, the valve element 106 is axially pressed against the valve seat 107 even though the valve seat 107 is a little inclined. Thus, the valve element 106 does not bear against the valve seat 107 with uniform pressure in a circumferential direction of the valve seat 107. Specifically, the valve element 106 is pressed hard against a high portion of the valve seat 107 but it is pressed lightly against a lower portion of the same. This may cause leakage through a gap occurring between the valve element 106 and the lightly-pressed lower portion of the valve seat 107. Further, when the valve seat 107 is plastic-deformed, a portion of the valve element 106 to be partially pressed against the valve seat 107 is likely to deteriorate, leading to a decrease in sealing strength with time.

This problem would be especially problematic in the case where the chemical liquid valve 100 is used in the liquid supply line of the semiconductor manufacturing apparatus to control a high-pressure fluid. To be concrete, the valve element 106 must be pressed against firmly the valve seat 107 in order to interrupt the flow of the high-pressure fluid, which tends to cause deformation of the valve seat 107. Deterioration of the valve seat 107 also may cause leakage of the high-pressure fluid through a deteriorated portion.

The present invention has been made to solve the above problems and has a purpose to provide a chemical liquid valve having stable sealing strength.

(1) To achieve the above purpose, the present invention provides a chemical liquid valve comprising: a valve element; an inlet port; an outlet port; a valve seat provided between the inlet port and the outlet port; and a driving device coupled to the valve element and arranged to bring the valve element into/out of contact with the valve seat; wherein the driving device is formed with a recess which holds the valve element and a cutout portion opening in a side surface and communicating with the recess, and the valve element is provided with an engagement part inserted in the recess through the cutout portion and engaged in the recess so that the valve element is swingably held by the driving device.

(2) According to another aspect, the present invention provides a chemical liquid valve comprising: a body formed with an inlet port and an outlet port; a valve seat integrally formed with the body; a driving device; and a valve element coupled to the driving device and arranged to be brought into/out of contact with the valve seat; wherein the valve element is swingably held by the driving device, and the body is made of resin and the valve seat integral with the body is made of resin.

(3) Further, according to another aspect, the present invention provides a chemical liquid valve comprising: a valve element; an inlet port; an outlet port; a valve seat provided between the inlet port and the outlet port; and a driving device coupled to the valve element and arranged to bring the valve element into/out of contact with the valve seat; the valve element is provided with an engagement part, and the driving device is formed with a recess which holds the engagement part of the valve element, and a clearance is provided between the engagement part and the recess.

The following explanation is made on the effects and operations of the present invention having the above structures.

The chemical liquid valve is arranged such that the diaphragm is attached to the driving device by inserting the engagement part from the cutout portion of the driving device into the recess, so that the driving force of the driving device is transmitted to the diaphragm. When the valve element is brought out of contact with the valve seat by the driving device, fluid is allowed to flow from the inlet port to the outlet port. When the valve element is brought into contact with the valve seat by the driving device, the flow passage is blocked off to stop the flow of fluid from the inlet port to the outlet port. For example, when the valve element is brought into contact with the valve seat by the driving device if the valve seat contains a little inclination caused by deformation, the valve element is swung (or tilted) along the inclination of the valve seat and accordingly is pressed against the entire valve seat with uniform pressure. Thus, the sealing strength between the valve element and the valve seat is enough to prevent leakage of fluid. Since the valve element is pressed against the valve seat with uniform pressure and therefore the valve seat is unlikely to deteriorate, the sealing strength will hardly change with time. Consequently, the chemical liquid valve of the present invention can prevent leakage of fluid during a valve closed time and provide stable sealing strength. Further, the chemical liquid valve of the present invention can be assembled by simple attachment of the diaphragm to the driving device so that the driving device holds the diaphragm swingably.

The chemical liquid valve of the present invention is arranged such that the body is made of resin and the valve seat integral with the body is also made of resin. When the valve element is pressed against the valve seat by the driving device, a reaction force is caused in the valve seat against the pressing force of the valve element, pressing up a large-pressing-force portion of the valve element higher than a small-pressing-force portion of the same. Since the valve element swingably held by the driving device can tilt in every direction, it will tilt upon receiving the force from the valve seat. This tilting additionally applies the pressing force to the small-pressing-force portion of the valve element, while reduces the pressing force to the large-pressing-force portion of the valve element. Accordingly, the valve element is pressed against the valve seat with uniform pressure, providing stable sealing strength.

The chemical liquid valve of the present invention is further arranged such that the driving device is provided with the recess in which the engagement part of the valve element is held with clearance between the engagement part and the recess. Accordingly, the engagement part tilts in the recess to swing the valve element with respect to the driving device. When the valve element is to be brought into contact with the valve seat by the driving device, the valve element tilts along the inclination of the valve seat. When the valve element is to be brought out of contact with the valve seat, on the other hand, the driving device is moved independently until the engagement part engages with the driving device, and then the valve element is lifted to separate from the valve seat. At this time, the valve element is axially lifted up by the driving device. The tilt of the valve element caused when brought into contact with the valve seat will be corrected. According to the chemical liquid valve of the present invention, consequently, the valve element is allowed to swing along the inclination of the valve seat and come into contact with the valve seat with uniform pressure, which can achieve stable sealing strength.

DETAILED DESCRIPTION OF THE PREFERRED EMBODIMENTS

A detailed description of preferred embodiments of the present invention will now be given.

First Embodiment

Figure 1:
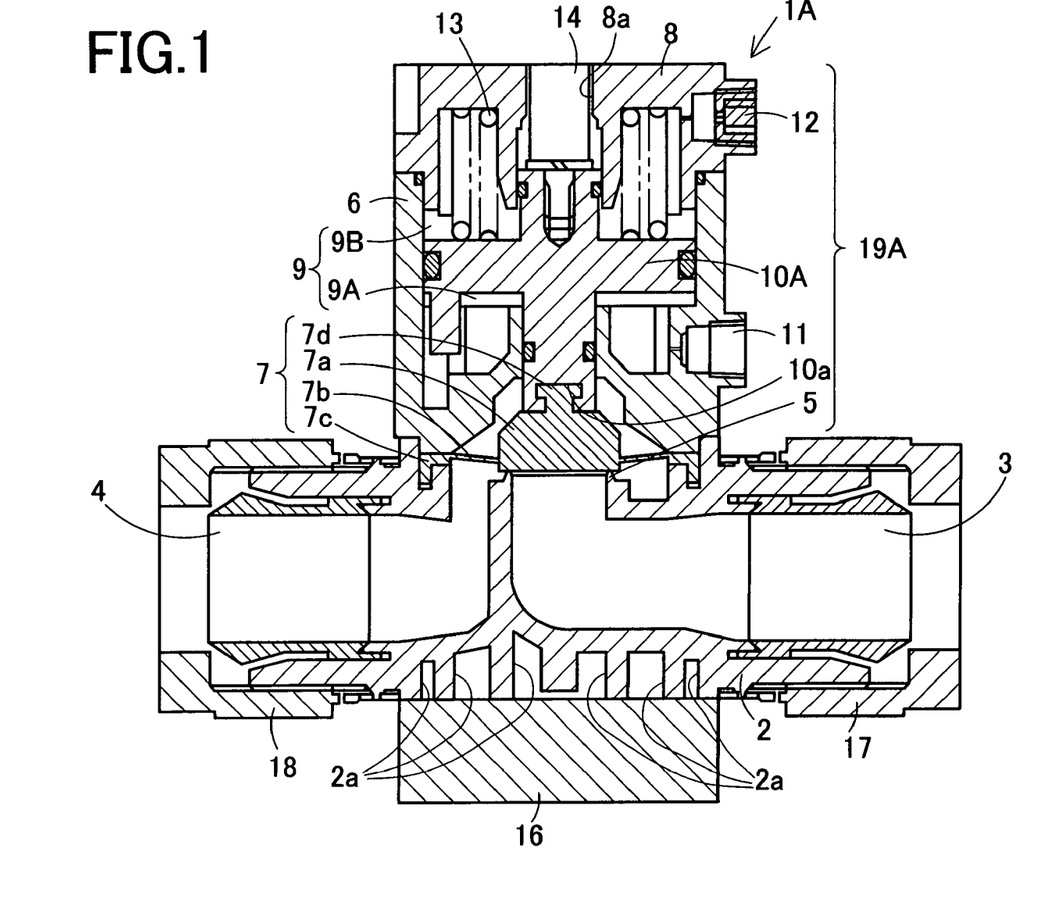
FIG. 1 is a sectional view of a chemical liquid valve in a first embodiment of the present invention, showing a valve closed state.
Figure 2:
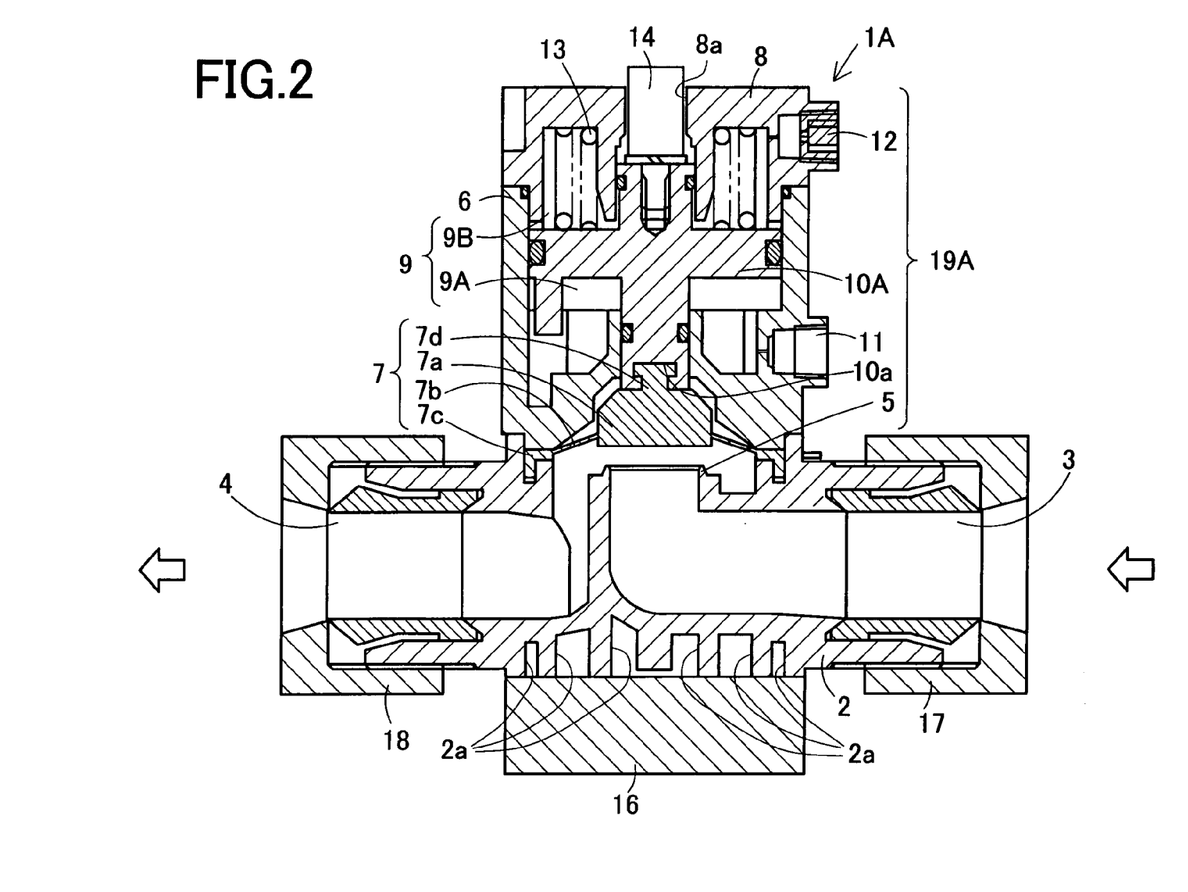
FIG. 2 is a sectional view of the chemical liquid valve in the first embodiment, showing a valve open state.

A chemical liquid valve in a first embodiment of the present invention is first described with reference to accompanying drawings. FIG. 1 is a sectional view of a chemical liquid valve 1A in a valve closed state. FIG. 2 is a sectional view of the chemical liquid valve 1A in a valve open state.

The chemical liquid valve 1A is located in for example a liquid supply line of a semiconductor manufacturing apparatus and used to control a flow rate of a high-pressure (e.g., about 700 kPa) chemical liquid. The chemical liquid valve 1A includes a body 2 and an actuator assembly 19A coupled to the body 2. The chemical liquid valve 1A is an air-operated valve arranged to bring a diaphragm 7 into/out of contact with a valve seat 5 in association with movements of a piston rod 10A provided in the actuator assembly 19A.

The body 2 is made of fluorocarbon resin such as PTFE (polytetrafluoroethylene) and PFA (a copolymer of tetrafluoroethylene and a perfluoro(alkyl vinyl ether)) in view of resistance to corrosion or other properties, which is molded in block shape by injection molding. The body 2 is formed with an inlet port 3 and an outlet port 4, between which the valve seat 5 is integrally formed. On the body 2, a cylinder 6 and a cover 8 are placed one on top of the other. With four screws inserted in the body 2 through the cover 8 and the cylinder 6, these body 2, cylinder 6, and cover 8 are secured to each other as one unit. In this manner, the actuator assembly 19A is coupled to the body 2.

A circumferential edge 7c of the diaphragm 7 is held between the body 2 and the cylinder 6. The diaphragm 7 includes a columnar valve element 7a connected with the thick circumferential edge 7c through a thin diaphragm part 7b. The diaphragm 7 is placed such that the valve element 7a is brought into/out of contact with the valve seat 5.

The cylinder 6 is molded in hollow cylindrical shape. A piston chamber 9 is provided by the cylinder 6 and the cover 8. In the piston chamber 9, a piston rod 10A is slidably mounted thereby partitioning the piston chamber 9 into a primary chamber 9A and a secondary chamber 9B. The primary chamber 9A is in communication with an operation port 11 formed in the cylinder 6. The secondary chamber 9B is in communication with an exhaust port 12 formed in the cover 8 and is provided with a pressing spring 13 in a compressed state, which constantly urges the piston rod 10A downward. The piston rod 10A has a bottom end connected to the diaphragm 7 and is operated by changes in pressure in the primary and secondary chambers 9A and 9B, thereby imparting upward/downward motion to the diaphragm 7. Threadably mounted on a top end of the piston rod 10A is an indicator 14 placed across the cover 8 so that the indicator 14 slides inward/outward in a through hole 8a of the cover 8.

The diaphragm 7 is swingably held by the bottom of the piton rod 10A. The diaphragm 7 includes an engagement part 7d that is formed coaxial with the valve element 7a and has a semispherical top end. The piston rod 10A is formed at its bottom with a recess 10a in which the engagement part 7d of the diaphragm 7 is engaged to hang thereon. The recess 10a of the piston rod 10A has an upper inner flat wall with which the engagement part 7d of the diaphragm 7 is in point contact. A clearance is provided between the piston rod 10A and the engagement part 7d of the diaphragm 7 so that the engagement part 7d may tilt in the recess 10a. This clearance is preferably a slight space enough to cover the dimensional tolerance of the valve seat 5. This is because excessive space tends to cause the engagement part 7d of the diaphragm 7 to wobble in the recess 10a of the piston rod 10A, leading to unstable control of the flow rate. The diaphragm 7 is made of resin such as PTFE and PFA and integrally includes the valve element 7a, the thin diaphragm part 7b, the circumferential edge 7c, and the engagement part 7d as shown in FIGS. 1 and 2.

Figure 3:
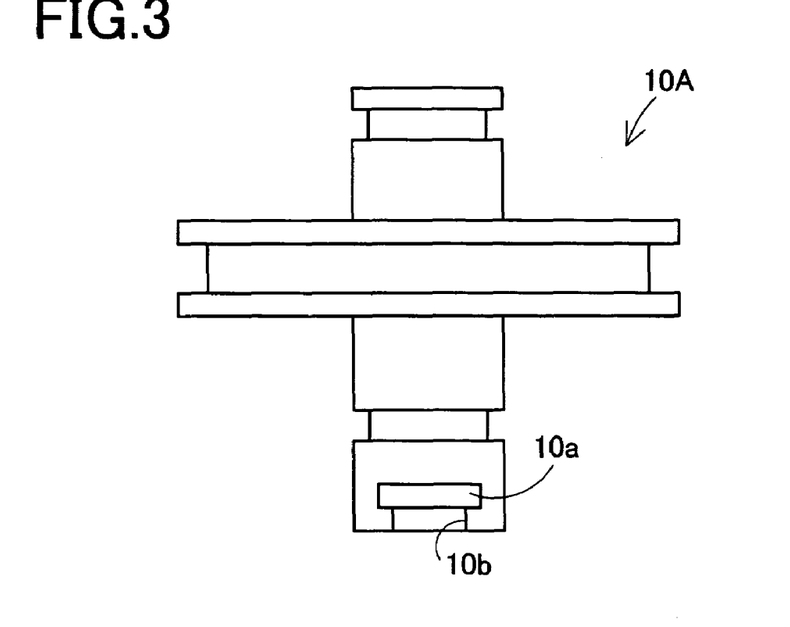
FIG. 3 is a side view of a cylinder rod in the first embodiment.
Figure 4:
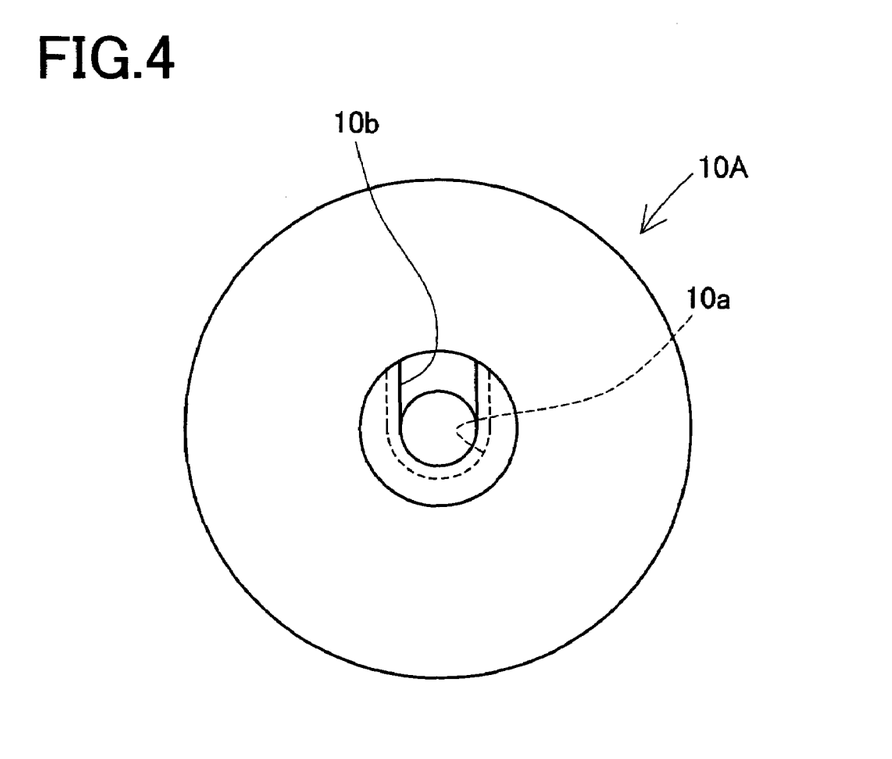
FIG. 4 is a bottom view of the cylinder rod in the first embodiment.

The piston rod 10A is configured so that the diaphragm 7 is detachably attached thereto. FIG. 3 is a side view of the piston rod 10A. FIG. 4 is a bottom view of the piston rod 10A.

The piston rod 10A is formed with a cutout portion 10b opening in a side surface and communicating with the recess 10a so that the engagement part 7d of the diaphragm 7 is slid into the recess 10a through the cutout portion 10b. Since there is the clearance between the recess 10a of the piston rod 10A and the engagement part 7d of the diaphragm 7, the diaphragm 7 can readily be attached to the piston rod 10A.

In such chemical liquid valve 1A, a mounting plate 16 is fixed to the bottom surface of the body 2 as shown in FIG. 1. This mounting plate 16 is secured with screws to the semiconductor manufacturing apparatus and pipes are connected to the inlet port 3 and the outlet port 4 through joints 17 and 18 respectively, so that the chemical liquid valve 1A is disposed in the chemical liquid supply line. The mounting plate 16 and the joints 17 and 18 are made of fluorocarbon resin by injection molding in view of resistance to corrosion.

Here, there may be cases where voids are generated when fluorocarbon resin is poured into a mold or a shrinkage rate of a thick portion exceeds a shrinkage rate of a thin portion during cooling of the poured fluorocarbon resin in the mold, resulting in an irregular surface of a fluid passage. Consequently, the body 2 of the chemical liquid valve 1A could not be made in a preferable shape. The thick portion of the body 2, or the bottom portion with no flow passage in the present embodiment, is therefore formed with thickness-reducing parts 2a to uniformize the thickness. Further, the mounting plate 16 may be provided with protrusions conforming to the shapes of the thickness-reducing parts 2a so that the protrusions are fit in the thickness-reducing parts 2a of the body 2.

Operations of the chemical liquid valve 1A having the above structure are explained.

When operation fluid is not supplied to the primary chamber 9A through the operation port 11, the piston rod 10A is pressed down by the pressing spring 13 as shown in FIG. 1, bringing the valve element 7a of the diaphragm 7 into contact with the valve seat 5. Accordingly, the chemical liquid supplied to the inlet port 3 is not allowed to flow out through the outlet port 4.

When the operation fluid is supplied to the primary chamber 9A through the operation port 11, the piton rod 10A is moved up against the urging force of the pressing spring 13 as shown in FIG. 2, bringing the valve element 7a of the diaphragm 7 out of contact with the valve seat 5. The chemical liquid is thus allowed to flow out through the outlet port 4 at a flow rate corresponding to the valve opening degree. At this time, the indicator 14 protrudes from the cover 8 in response to the upward motion of the diaphragm 7. An operator can recognize the valve open state of the chemical liquid valve 1A based on the protruding length of the indicator 14.

Figure 5:
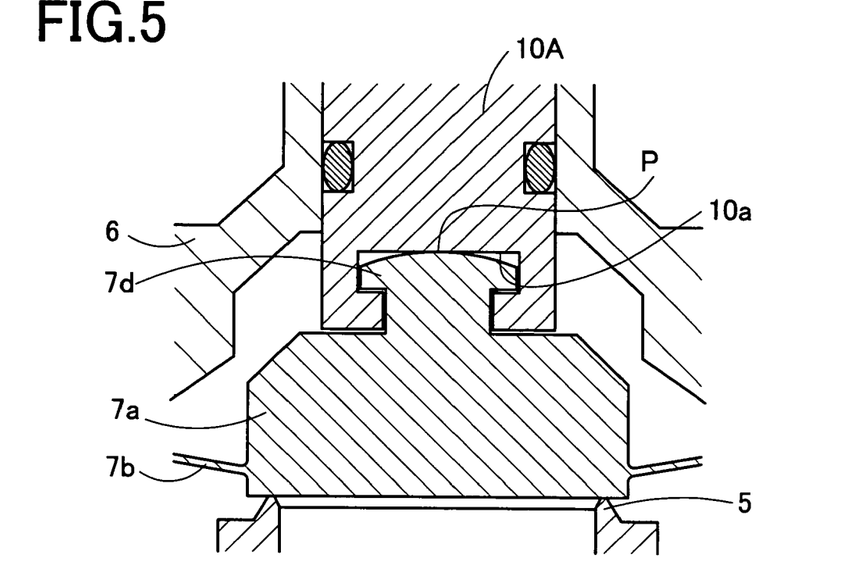
FIG. 5 is an enlarged view of a valve part in the first embodiment, showing the valve closed state.
Figure 6:
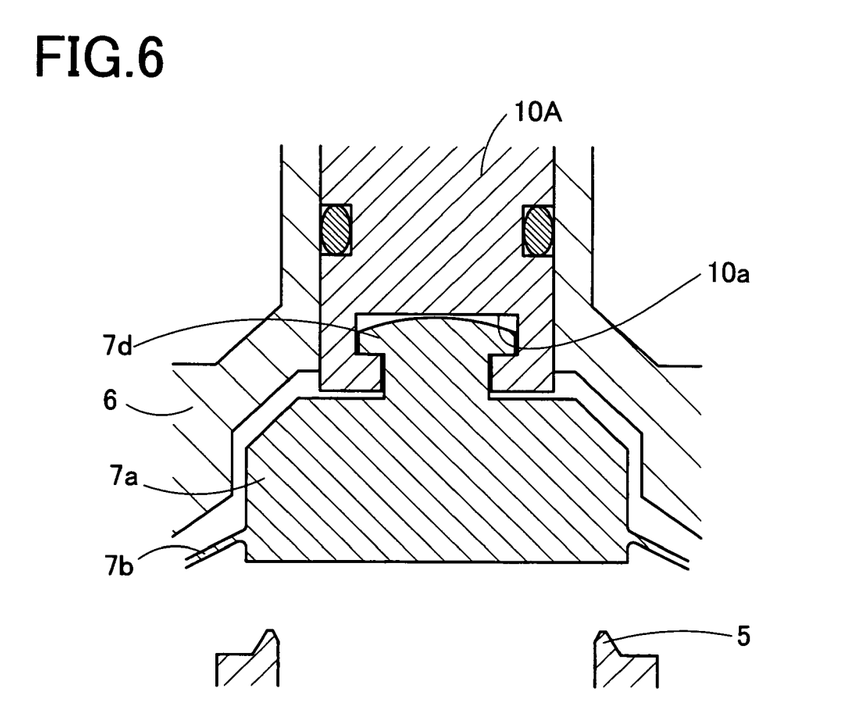
FIG. 6 is another enlarged view of the valve part in the first embodiment, showing the valve open state.

Details on the operation of the valve section are further explained. FIGS. 5 and 6 are enlarged views of the valve section.

When the chemical liquid valve 1A is to be operated to interrupt the chemical liquid, the piston rod 10A presses down the engagement part 7d of the diaphragm 7 in contact with the inner upper wall of the recess 10a to press the valve element 7a of the diaphragm 7 against the valve seat 5. The semispherical engagement part 7d of the diaphragm 7 is in point contact with the inner wall of the recess 10a of the piston rod 10A. Accordingly, the valve seat 5 receives the resilient force of the pressing spring 13 through the piston rod 10A and the diaphragm 7. If the valve seat 5 is slightly inclined, the valve element 7a of the diaphragm 7 is strongly pressed against the higher portion than the lower portion of the valve seat 5.

In this case, a reaction force is caused in the valve seat 5 against the pressing force of the diaphragm 7 and a larger reaction force acts on a large-pressing-force portion of the diaphragm 7 than on a small-pressing-force portion. The diaphragm 7 having the semispherical engagement part 7d is in point contact with the recess 10a of the piston rod 10A and therefore swingable in every direction. Accordingly, the engagement part 7d tilts to shift the position P having point-contact with the recess 10a of the piton rod 10A toward a side receiving large reaction force, causing the valve element 7a to tilt toward a side receiving small reaction force. Due to this tilt, the pressing force of the small-pressing-force portion is increased, while the pressing force of the large-pressing-force portion is reduced. Consequently, the valve element 7a is pressed against the valve seat 5 with the uniform strength in a circumferential direction thereof. The diaphragm 7 has spring characteristics resulting from a returning force of the thin diaphragm part 7b, so that the pressing force to press the valve element 7a against the valve seat 5 is fine adjusted. This makes it easy to uniformize the pressing force in the circumferential direction of the valve seat 5.

Further, when the chemical liquid valve 1A is to be operated to supply the chemical liquid, the piston rod 10A is independently moved up until the inner lower wall of the recess 10a of the piston rod 10A comes into contact with the engagement part 7d of the diaphragm 7, and then the piston rod 10A lifts the diaphragm 7 upward to bring the valve element 7a out of contact with the valve seat 5. At this time, the engagement part 7d is axially lifted up by the piston rod 10A, so that the tilt of the diaphragm 7 is corrected.

As above, in the chemical liquid valve 1A in the present embodiment, the diaphragm 7 swings along a slight inclination of the valve seat 5, bringing the valve element 7a into contact with the entire valve seat 5 with uniform pressure. This makes it possible to provide uniform sealing strength. Since the valve element 7a of the diaphragm 7 pressed against the valve seat 5 with uniform pressure does not readily deteriorate, the sealing strength will little change with time. Accordingly, the chemical liquid valve 1A can prevent leakage of chemical liquid during the valve closed state and stabilize the sealing strength. This is advantageous in the case where the chemical liquid valve 1A is used to control high-pressure fluid because the diaphragm 7 can be brought into contact with the valve seat 5 with uniform pressure, thereby preventing leakage of fluid through any portions having low sealing strength.

Even when the chemical liquid valve 1A is provided with the pressing spring 13 having a larger pressing force to ensure sealing load, the diaphragm 7 can also swing or tilt along the inclination of the valve seat 5 when deformed. Thus, the diaphragm 7 can be pressed against the valve seat 5 with uniform pressure in the circumferential direction of the valve seat 5. This makes it possible to prevent leakage of fluid. Further, since the sealing strength is ensured by swinging or tilting of the diaphragm 7, deterioration of the valve seat 5 is reduced. During the valve closed period, the high-pressure chemical liquid can be prevented from escaping.

In particular, the diaphragm 7 is structured such that the engagement part 7d swings or tilts about the point contact portion with the recess 10a of the piston rod 10A without limitation swinging direction. The diaphragm 7 can follow the inclination of the valve seat 5 even if deformed in any direction. Thus, the valve seat 5 may be formed with rough machining accuracy, resulting in improved productivity.

In addition, the diaphragm 7 is coupled to the piston rod 10A in such a manner that the engagement part 7d of the diaphragm 7 is inserted in the recess 10a of the piston rod 10A through the cutout portion 10b and engaged in the recess 10a to hang thereon. In this way, the diaphragm 7 can readily be attached to the piston rod 10A.

The chemical liquid valve 1A is arranged as mentioned above such that the resilient force of the pressing spring 13 acts on the valve seat 5 through the piston rod 10A and the diaphragm 7 during the valve closed state. As mentioned above, the mounting plate 16 may be provided with the protrusions which are fit in the thickness-reducing parts 2a of the body 2. This makes it possible to enhance the strength of the body 2 as compared with the case where the body 2 has the thickness-reducing parts 2a as voids. In this case, even where the chemical liquid valve 1A is provided with the pressing spring 13 having a larger resilient force to control the high-pressure chemical liquid, the body 2 will not be deformed and the valve seat 5 will not be broken or inclined. Consequently, even when the chemical liquid valve 1A is used to control high-pressure fluid of about 700 kPa for example, the pressing spring 13 of a larger resilient force may be provided to ensure the sealing strength.

Second Embodiment

Figure 7:
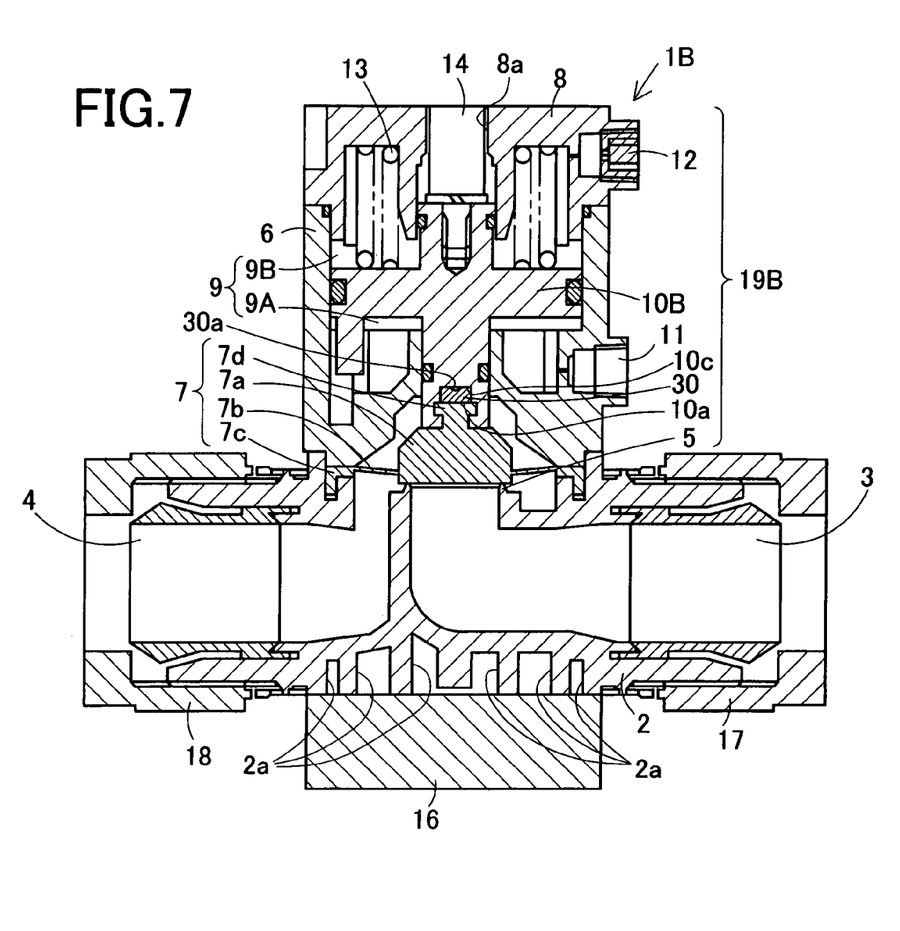
FIG. 7 is a sectional view of a chemical liquid valve in a second embodiment of the present invention.

Next, a chemical liquid valve in a second embodiment of the present invention will be explained with reference to drawings. FIG. 7 is a sectional view of a chemical liquid valve 1B.

The chemical liquid valve 1B is substantially identical in basic structure to the chemical liquid valve 1A in the first embodiment but a rubber member 30. Here, the following explanation is made with a focus on such different structure from the chemical liquid valve 1A in the first embodiment. Similar or identical parts are assigned the same referential signs with those in the chemical liquid valve 1A in the first embodiment and therefore the explanations thereof are not repeated here.

The chemical liquid valve 1B includes a body 2 and an actuator assembly 19B coupled to the body 2. The chemical liquid valve 1B is arranged to bring a diaphragm 7 into/out of contact with a valve seat 5 by sliding a piston rod 10B in a piston chamber 9 to thereby control a flow rate of a chemical liquid which flows from an inlet port 3 to an outlet port 4.

Slidably mounted in the actuator assembly 19B is a piston rod 10B formed with a recess 10a, a cutout portion 10b, and further a mounting recess 10c coaxially with the recess 10a. In the mounting recess 10c, the rubber member 30 is mounted. The rubber member 30 is of a substantial columnar shape and has a recess 30a at the upper end thereof. This recess 30a is to provide a clearance allowing elastic deformation of the rubber member 30 in the mounting recess 10c. The rubber member 30 is fit in the mounting recess 10c with the recess 30a facing upward and then the piston rod 10B is coupled to the diaphragm 7 by inserting the engagement part 7d into the recess 10a via the cutout portion 10b. The rubber member 30 is placed in a compressed state between the engagement part 7d of the diaphragm 7 and the recess 10a of the piston rod 10B. The engagement part 7d is engaged in the recess 10a of the piston rod 10B so as to be in contact with a flat bottom surface of the rubber member 30. Thus, the diaphragm 7 is held swingably with respect to the piston rod 10B.

Figure 8:
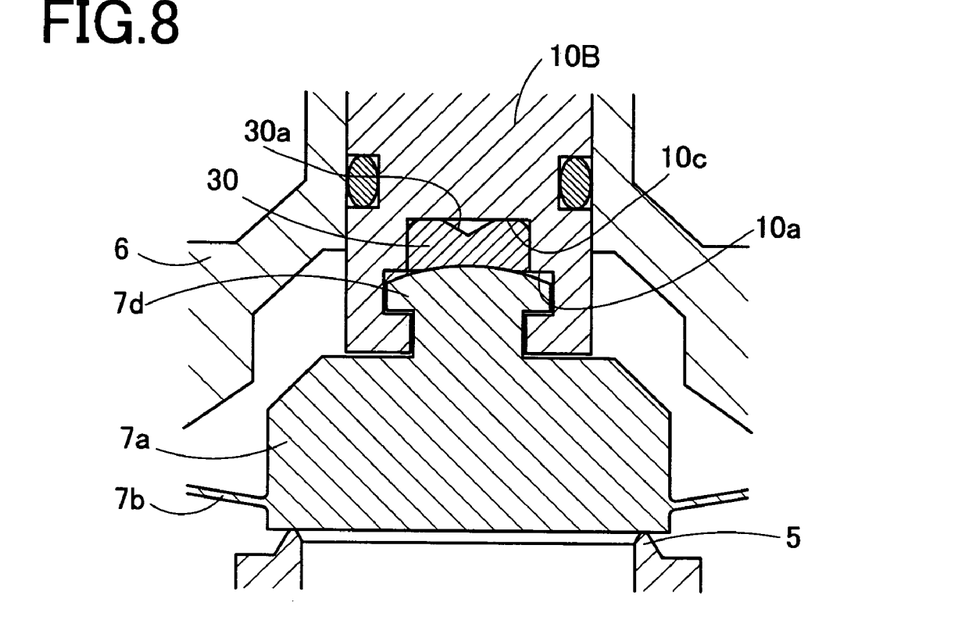
FIG. 8 is an enlarged view of a valve part in the second embodiment, showing a valve closed state.
Figure 9:
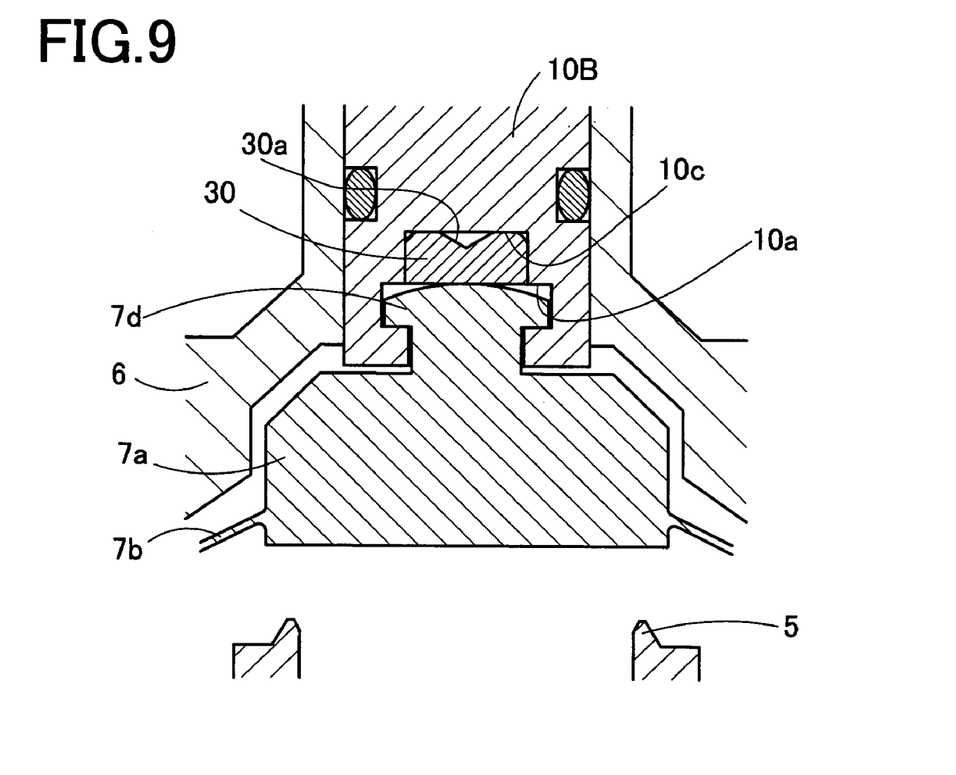
FIG. 9 is another enlarged view of the valve part in the second embodiment, showing a valve open state.

Operations of the chemical liquid valve 1B are explained below. FIGS. 8 and 9 are enlarged views of the valve section.

When the chemical liquid valve 1B is to be operated to interrupt the chemical liquid, the piston rod 10B presses the engagement part 7d of the diaphragm 7 downward through the inner upper wall of the recess 10a as shown in FIG. 8, pressing the valve element 7a of the diaphragm 7 against the valve seat 5. At this time, the rubber member 30 is pressed and deformed between the recess 10a of the piston rod 10B and the engagement part 7d of the diaphragm 7, and is in surface contact with the engagement part 7d of the diaphragm 7. For example, if the valve seat 5 is in a slightly inclined state resulting from e.g., deformation, the diaphragm 7 swings along the inclination of the valve seat 5 while elastically deforming the rubber member 30 to bring the recess 30a out of shape. The diaphragm 7 comes into contact with the entire valve seat 5 with uniform pressure.

Here, the engagement part 7d of the diaphragm 7 is of a semispherical shape. For exactly centering the center of the engagement part 7d on the diaphragm 7, the engagement part 7d must be subjected to a cutting work following injection molding of the diaphragm 7. In the present embodiment, on the other hand, the diaphragm 7 is allowed to swing with the engagement part 7d being held in surface contact with the rubber member 30 while elastically deforming the rubber member 30. It is accordingly unnecessary to strictly center the center of the engagement part 7d on the diaphragm 7, not requiring high machining accuracy of the diaphragm 7.

When the chemical liquid valve 1B is to be operated to supply the chemical liquid, on the other hand, as the piston rod 10B moves up as shown in FIG. 9, the rubber member 30 returns to its original shape, pressing the engagement part 7d of the diaphragm 7 downward, and the inner wall of the recess 10a of the piston rod 10B engages with the engagement part 7d. When the piston rod 10B lifts the diaphragm 7 upward, the engagement part 7d is firmly held between the bottom surface of the rubber member 30 and the inner wall of the recess 10a of the piston rod 10B, so that the diaphragm 7 can be prevented from wobbling. Consequently, the fluid can be controlled to flow at a stable flow rate from the inlet port 3 to the outlet port 4.

According to the chemical liquid valve 1B in the present embodiment, the valve element 7a of the diaphragm 7 is held in the piston rod 10B through the rubber member 30. Thus, the diaphragm 7 may be formed with rough machining accuracy, resulting in improved productivity.

Third Embodiment

Figure 10:
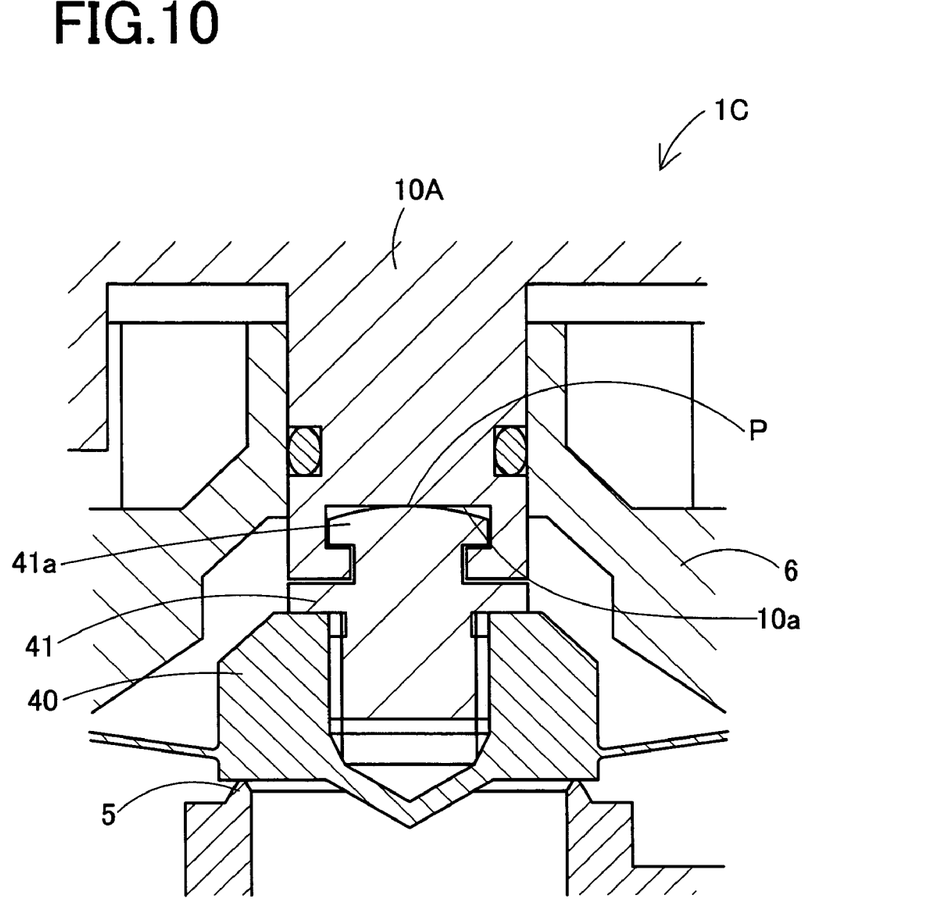
FIG. 10 is an enlarged view of a valve part of a chemical liquid valve in a third embodiment of the present invention, showing a valve closed state.

Next, a chemical liquid valve of the present invention in a third embodiment is explained with reference to drawings. FIG. 10 is an enlarged view of a valve section of a chemical liquid valve 1C in a valve closed state.

The chemical liquid valve 1C is substantially identical in basic structure to the chemical liquid valve 1A in the first embodiment excepting that a diaphragm 40 and an engagement member 41 are made as separate members. Here, the following explanation is made with a focus on such different structure from the chemical liquid valve 1A in the first embodiment. Similar or identical parts are assigned the same referential signs with those in the chemical liquid valve 1A in the first embodiment and therefore the explanations thereof are not repeated here.

The chemical liquid valve 1C includes a body 2 and an actuator assembly 19A coupled to the body 2 with a connecting member not shown. The chemical liquid valve 1C is arranged to bring the diaphragm 40 into/out of contact with a valve seat 5 by sliding a piston rod 10A in a piston chamber 9 to thereby control a flow rate of a chemical liquid which flows from an inlet port 3 to an outlet port 4.

Slidably mounted in the actuator assembly 19A is the piston rod 10A formed with a recess 10a and a cutout portion 10b. With respect to the recess 10a of the piston rod 10A, the diaphragm 40 is swingably held through the engagement member 41. The engagement member 41 is formed with external threads which engage with internal threads of the diaphragm 40 in integral relation, so that the engagement member 41 and the diaphragm 40 are detachably coupled to each other. The engagement member 41 is held to hang from the piston rod 10A in such a manner that an upper end 41a is inserted in the recess 10a via the cutout portion 10b of the piston rod 10A. The upper end 41a of the engagement member 41 is formed in semispherical shape and in point contact with the recess 10a of the piston rod 10A. A slight clearance is provided between the recess 10a of the piston rod 10A and the upper end 41a of the engagement member 41 so that the upper end 41a of the engagement member 41 may tilt in the recess 10a of the piston rod 10A. In the present embodiment, the "valve element" is assembled by coupling the engagement member 41 to the diaphragm 40. The engagement member 41 is made of a material harder than the diaphragm 40 to reduce permanent set of the upper end 41a of the engagement member 41 when tilts in the recess 10a of the piston rod 10A.

The operation of the chemical liquid valve 1C is explained below.

When the chemical liquid valve 1C is to be operated to interrupt the chemical liquid, the piston rod 10A presses the upper end 41a of the engagement member 41 downward in the figure through the inner upper wall of the recess 10a, pressing the diaphragm 40 against the valve seat 5. The semispherical upper end 41a of the engagement member 41 is in point contact with the inner wall of the recess 10a of the piston rod 10A. Accordingly, the resilient force of the pressing spring 13 is transmitted to the valve seat 5 through the piston rod 10A, engagement member 41, and diaphragm 40. If the valve seat 5 is in a slightly inclined state resulting from e.g., deformation, the diaphragm 40 is pressed against a higher portion of the valve seat 5 more strongly than against a lower portion thereof.

In this case, a reaction force is caused in the valve seat 5 against the pressing force of the diaphragm 40 and a larger reaction force acts on a large-pressing-force portion of the diaphragm 40 than a small-pressing-force portion. The engagement member 41 coupled to the diaphragm 40 and provided with the semispherical upper end 41a is in point contact with the recess 10a of the piston rod 10A and therefore swingable in every direction. Accordingly, the upper end 41a tilts to shift the position P having point-contact with the recess 10a of the piston rod 10A toward a side receiving large reaction force, causing the diaphragm 40 to tilt toward a side receiving small reaction force. Due to this tilt, the pressing force of the small-pressing-force portion is increased, while the pressing force of the large-pressing-force portion is reduced. Consequently, the diaphragm 40 is pressed against the valve seat 5 with the uniform strength in a circumferential direction thereof.

Further, when the chemical liquid valve 1C is to be operated to supply the chemical liquid, the piston rod 10A is independently moved up until the inner lower wall of the recess 10a comes into contact with the upper end 41a of the engagement member 41, and then the piston rod 10A lifts the diaphragm 40 through the engagement member 41 upward to bring the diaphragm 40 out of contact with the valve seat 5. At this time, the engagement member 41 is axially lifted up by the piston rod 10A, so that the tilt of the diaphragm 40 is corrected. Thus, when the diaphragm 40 is pressed against the valve seat 5 next time, the engagement member 41 with the upper end 41a is allowed to swing in the recess 10a of the piston rod 10A according to the inclination of the valve seat 5, thereby allowing the diaphragm 40 to tilt along the inclination of the valve seat 5.

As above, in the chemical liquid valve 1C in the present embodiment, during repeated valve-opening/closing operations, the engagement member 41 swings while the upper end 41a rubs against the recess 10a of the piston rod 10A. The engagement member 41 needs not have flexibility to transform like a thin diaphragm portion of the diaphragm 40 and is made of a harder material than the diaphragm 40. Accordingly, the engagement member 41 is less deformable even though the upper end 41a rubs against the recess 10a of the piston rod 10A. This makes it possible to maintain for years the swingable function of the engagement member 41 which swings along the inclination of the valve seat 5.

The embodiments of the present invention have been described as above; however, the present invention is not limited to the above embodiments and may be embodied in other various forms.

(1) For example, in the above embodiments, the piston rod 10A, 10B is formed with the recess 10a and the diaphragm 7 is provided with the engagement part 7d which is engaged in the recess 10a. Alternatively, the piston rod may be provided at its bottom with an engagement part and the diaphragm may be formed with a recess in which the engagement part is engaged.

(2) For example, in the above embodiments, the explanations are made on the chemical liquid valve 1A, 1B of air-operated type. Alternatively, the above structure may be applied to a hand valve, a suck-back valve, or the like. Although the chemical liquid valves 1A and 1B described in the above embodiments are each arranged to allow the chemical liquid to flow from the inlet port 3 to the outlet port 4, further, a valve allowing fluid to flow in two directions, a flow dividing valve, or the like may also be adopted.

(3) In the above embodiments, for example, a diaphragm valve that the diaphragm 7 is brought into/out of contact with the valve seat 5 is used. Alternatively, a poppet valve may be used.

(4) In the second embodiment, for example, the rubber member 30 is used as an elastic member. In place of the rubber member 30, a coil spring, a plate spring, or the like may be provided between the piston rod 10A, 10B and the engagement part 7d of the diaphragm 7. In this case, it is possible to provide a larger force than the rubber member 30, whereby preventing the diaphragm 7 from wobbling even in case of higher pressure fluid. The flow rate of the chemical liquid can thus be controlled stably.

What is claimed is:
1. A chemical liquid valve comprising:
   a mounting plate;
   a valve element;
   a body made of resin and provided with an inlet port, an outlet port, a bottom portion with thickness-reducing parts configured to render a uniform thickness to the bottom portion, and at least one rib defined by the thickness-reducing parts and placed in contact with the mounting plate;

a valve seat made of resin provided between the inlet port and the outlet port; and a driving device coupled to the valve element and arranged to bring the valve element into and out of contact with the valve seat, wherein the driving device includes:
 a cylinder coupled to the body;
 a cover for closing one end of the cylinder;
 a piston chamber formed between the cylinder and the cover; and
 a piston rod slidably mounted in the piston chamber, the piston rod being formed with a recess which holds the valve element and a cutout portion opening in a side surface and communicating with the recess, the valve element includes a columnar valve element part movable into and out of contact with the valve seat, a thin diaphragm part connected to the valve element part, and an engagement part formed coaxially with the valve element part and with a semispherical top end, the engagement part disposed in the recess through the cutout portion and engaged in the recess so that the valve element is swingably held by the driving device so as to tilt the valve element to apply a uniform force to the valve seat when the valve element is in a swinging position, and the engagement part makes point contact with an inner upper wall of the recess during a valve closed state and engages with an inner lower wall of the recess during a valve open state to form a clearance between a top end of the engagement part and the inner upper wall of the recess.

2. The chemical liquid valve set forth in claim 1, further comprising an elastic member between the engagement part and the recess.

3. The chemical liquid valve set forth in claim 1, wherein the valve element further includes a valve element part detachably coupled to the engagement part so that the valve element part is brought into and out of contact with the valve seat.

* * * * *